(12) United States Patent
Kursun

(10) Patent No.: US 11,669,713 B2
(45) Date of Patent: *Jun. 6, 2023

(54) SYSTEM AND METHOD FOR ONLINE RECONFIGURATION OF A NEURAL NETWORK SYSTEM

(71) Applicant: Bank of America Corporation, Charlotte, NC (US)

(72) Inventor: Eren Kursun, New York City, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1130 days.

This patent is subject to a terminal disclaimer.

(21) Appl. No.: 16/209,372

(22) Filed: Dec. 4, 2018

(65) Prior Publication Data

US 2020/0175350 A1 Jun. 4, 2020

(51) Int. Cl.
*G06N 3/02* (2006.01)
*G06F 9/445* (2018.01)

(52) U.S. Cl.
CPC .......... *G06N 3/02* (2013.01); *G06F 9/44505* (2013.01)

(58) Field of Classification Search
CPC ............................................. G06N 3/02–049
USPC .................................................... 706/15–44
See application file for complete search history.

(56) References Cited

U.S. PATENT DOCUMENTS

| | | |
|---|---|---|
| 7,089,592 B2 | 8/2006 | Adjaoute |
| 7,152,157 B2 | 12/2006 | Murphy et al. |
| 8,719,105 B2 | 5/2014 | Minnis et al. |
| 9,449,257 B2 | 9/2016 | Shi et al. |
| 10,018,997 B2 | 7/2018 | Worek et al. |
| 2012/0079298 A1 | 3/2012 | Majumdar |
| 2013/0151449 A1 | 6/2013 | Ponulak |
| 2013/0325775 A1 | 12/2013 | Sinyavskiy et al. |
| 2015/0046332 A1 | 2/2015 | Adjaoute |
| 2015/0106311 A1* | 4/2015 | Birdwell ................. G06N 3/08 706/26 |
| 2015/0347600 A1 | 12/2015 | Tabe |
| 2016/0155049 A1* | 6/2016 | Choi ..................... G06N 3/084 706/16 |
| 2016/0321081 A1 | 11/2016 | Kim et al. |
| 2017/0213126 A1 | 7/2017 | Hammond et al. |

(Continued)

OTHER PUBLICATIONS

Kamioka et al. "NeuroEvolution Based on Reusable and Hierarchical Modular Representation", 2008, ICONIP 2008: Advances in Neuro-Information Processing.*
Rempis et al. "Search Space Restriction of Neuro-Evolution Through Constrained Modularization of Neural Networks", 2010, Proceedings of the 6th International Workshop on Artificial Neural Networks and Intelligent Information Processing.*

(Continued)

*Primary Examiner* — Jue Louie
(74) *Attorney, Agent, or Firm* — Moore & Van Allen PLLC; Seongun M. Hong

(57) ABSTRACT

The present disclosure is directed to a novel system for performing online reconfiguration of a neural network. Once a neural network has been implemented into a production environment, the system may use underlying construction logic to perform an in-situ reconfiguration of neural network elements while the neural network is live. The system may accomplish the reconfiguration by modifying the architecture of the neural network and/or performing adversarial training and/or retraining. In this way, the system may provide a way increase the performance of the neural network over time along one or more performance parameters or metrics.

20 Claims, 4 Drawing Sheets

(56) References Cited

U.S. PATENT DOCUMENTS

| | | | |
|---|---|---|---|
| 2018/0075339 A1 | 3/2018 | Ma et al. | |
| 2018/0189631 A1 | 7/2018 | Sumbul et al. | |
| 2019/0042918 A1 | 2/2019 | Meyer et al. | |
| 2019/0129405 A1 | 5/2019 | Cella et al. | |
| 2019/0130246 A1 | 5/2019 | Katayama | |
| 2019/0130268 A1 | 5/2019 | Shiring et al. | |
| 2019/0197018 A1 | 6/2019 | Evans et al. | |
| 2019/0266218 A1 | 8/2019 | Scott et al. | |
| 2019/0279038 A1 | 9/2019 | Nicol | |
| 2019/0311253 A1 | 10/2019 | Chung et al. | |
| 2019/0325295 A1 | 10/2019 | Modha et al. | |
| 2019/0325309 A1 | 10/2019 | Flamant | |
| 2020/0293899 A1 | 9/2020 | Fernando | |
| 2021/0133576 A1* | 5/2021 | Hutter | G06N 3/04 |

OTHER PUBLICATIONS

Tramer et al. "Ensemble Adversarial Training: Attacks and Defenses", 2017, https://arxiv.org/abs/1705.07204v1.*

Kousu, Imbalanced Dataset Sampler, Github, Jun. 2018 (Year: 2018), (cited in related U.S. Appl. No. 16/209,363 on Nov. 2, 2022), 4 pages.

AWS Retraining Models on New Data—Amazon Machine Learning Developers Guide, 2015 (Year: 2015), (cited in related U.S. Appl. No. 16/209,363 on Nov. 2, 2022), 1 page.

Prechelt, L., "Early Stopping but When?", Neural Networks: Tricks of the Trade, 2nd Ed. Springer, pp. 53-67, 2012 (Year: 2012) (cited in related U.S. Appl. No. 16/209,363 on Nov. 2, 2022), 15 pages.

* cited by examiner

SYSTEM AND METHOD FOR ONLINE RECONFIGURATION OF A NEURAL NETWORK SYSTEM

FIELD OF THE INVENTION

The present disclosure embraces a system, computer program product, and computer-implemented method for a system for a self-constructing deep neural network using a hybrid logic library and an algorithm.

BACKGROUND

Current techniques for constructing neural network architectures typically involve the manual selection of elements. As the structure of neural networks increase in depth and complexity, manual exploration of said neural networks becomes increasingly difficult, or in some cases, impracticable. Furthermore, conventional methods do not provide an efficient way to optimize the performance of the neural network once it has been implemented into the production environment. Accordingly, there is a need for a scalable and efficient way to construct deep neural networks and perform real-time reconfiguration of the neural networks once constructed.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for performing online reconfiguration of a neural network. Once a neural network has been implemented into a production environment, the system may use underlying construction logic to perform an in-situ reconfiguration of neural network elements while the neural network is live. The system may accomplish the reconfiguration by modifying the architecture of the neural network and/or performing adversarial training and/or retraining. In this way, the system may provide a way increase the performance of the neural network over time along one or more performance parameters or metrics.

Accordingly, embodiments of the present disclosure provide a system for online reconfiguration of a neural network, The system may comprise a processor; a communication interface; and a memory having executable code stored thereon. The executable code, when executed by the processor, may cause the processor to access a building block library, wherein the building block library is a hybrid hierarchical library comprising one or more library blocks having adaptability characteristics embedded, the one or more library blocks comprising flexible parent structures with configurable characteristics; select, from the one or more library blocks, a set of library blocks; automatically generate a neural network using a self-constructing neural network architecture, wherein the neural network comprises a set of library blocks; and perform, via a controller, online reconfiguration of the neural network, wherein the controller makes decisions on the reconfiguration of the neural network and levels of reconfiguration needed.

In some embodiments, performing online reconfiguration of the neural network comprises continuously monitoring, in real time, a data pattern of the neural network; based on continuously monitoring the data pattern, using construction logic of an algorithm to decide on a reconfiguration of the neural network; implementing the reconfiguration of the neural network; and assessing an effect of the reconfiguration of the neural network on a first performance metric.

In some embodiments, the executable code further causes the processor to based on continuously monitoring the data pattern, use construction logic to decide on a second reconfiguration of the neural network; implement the second reconfiguration of the neural network; and assess an effect of the second reconfiguration of the neural network on the first performance metric.

In some embodiments, the construction logic is further used to decide on the reconfiguration of the neural network based on adversarial interaction patterns.

In some embodiments, the algorithm is a custom, multi-objective genetic-based algorithm, wherein the algorithm comprises, for each library block, i) a high-level spec mode; and ii) an in-situ optimization mode to optimize block performance.

In some embodiments, the algorithm is used to perform training and retraining of the neural network.

In some embodiments, the reconfiguration of the neural network comprises an online change in the depth of the neural network, the interconnectivity of the neural network, the neural network architecture, functionality of the neural network, activation functions, edge weights, or number of neurons.

In some embodiments, the reconfiguration of the neural network comprises replacing a macro within the neural network with another macro.

Embodiments of the present disclosure also provide a controller for online reconfiguration of a neural network, wherein the controller performs construction, reconfiguration toward optimization, and adaptation of the neural network, the controller comprising a processor communicatively coupled to a communication interface and a memory having executable stored thereon, wherein the executable code comprises a macro for hierarchically dividing neural network functionality into smaller building blocks, wherein the executable code, when executed by the processor, causes the processor to access a building block library, wherein the building block library is a hybrid hierarchical library comprising one or more library blocks having adaptability characteristics embedded, the one or more library blocks comprising flexible parent structures with configurable characteristics; select, from the one or more library blocks, a set of library blocks; automatically generate a neural network using a self-constructing neural network architecture, wherein the neural network comprises a set of library blocks; and perform online reconfiguration of the neural network, wherein the controller makes decisions on the reconfiguration of the neural network and levels of reconfiguration needed.

In some embodiments, performing online reconfiguration of the neural network comprises: continuously monitoring, in real time, a data pattern of the neural network; based on continuously monitoring the data pattern, using construction logic of an algorithm to decide on a reconfiguration of the neural network; implementing the reconfiguration of the neural network; and assessing an effect of the reconfiguration of the neural network on a first performance metric.

In some embodiments, the executable code further causes the processor to based on continuously monitoring the data pattern, use construction logic to decide on a second reconfiguration of the neural network; implement the second reconfiguration of the neural network; and assess an effect of the second reconfiguration of the neural network on the first performance metric.

In some embodiments, the construction logic is further used to decide on the reconfiguration of the neural network based on adversarial interaction patterns.

In some embodiments, the algorithm is a custom, multi-objective genetic-based algorithm, wherein the algorithm comprises, for each library block, i) a high-level spec mode; and ii) an in-situ optimization mode to optimize block performance.

In some embodiments, the algorithm is used to perform training and retraining of the neural network.

Embodiments of the present disclosure also provide a computer-implemented method for online reconfiguration of a neural network, the method comprising accessing a building block library, wherein the building block library is a hybrid hierarchical library comprising one or more library blocks having adaptability characteristics embedded, the one or more library blocks comprising flexible parent structures with configurable characteristics; selecting, from the one or more library blocks, a set of library blocks; automatically generating a neural network using a self-constructing neural network architecture, wherein the neural network comprises a set of library blocks; and performing, via a controller, online reconfiguration of the neural network, wherein the controller makes decisions on the reconfiguration of the neural network and levels of reconfiguration needed.

In some embodiments, performing online reconfiguration of the neural network comprises continuously monitoring, in real time, a data pattern of the neural network; based on continuously monitoring the data pattern, using construction logic of an algorithm to decide on a reconfiguration of the neural network; implementing the reconfiguration of the neural network; and assessing an effect of the reconfiguration of the neural network on a first performance metric In some embodiments, the method further comprises based on continuously monitoring the data pattern, using construction logic to decide on a second reconfiguration of the neural network; implementing the second reconfiguration of the neural network; and assessing an effect of the second reconfiguration of the neural network on the first performance metric.

In some embodiments, the construction logic is further used to decide on the reconfiguration of the neural network based on adversarial interaction patterns.

In some embodiments, the algorithm is a custom, multi-objective genetic-based algorithm, wherein the algorithm comprises, for each library block, i) a high-level spec mode; and ii) an in-situ optimization mode to optimize block performance.

In some embodiments, the algorithm is used to perform training and retraining of the neural network.

Self Constructing Neural Network Architecture

Manual design of neural networks are facing the limits as the size and complexity of neural networks have increased to ranges where efficient human exploration is not quite possible. In order to apply neural networks to a wide range of application areas, use cases, the system should have a level of autonomy instead of full custom design in each case. The neural network systems have the primary strength of learning, however manually training/retraining such systems limits their capabilities. The systems should be able to adopt to dynamic changes in the environment and wide range of use cases.

Hybrid Library Design

A corresponding library design is proposed, where the building macros are: parent structures with various configurable characteristics (such as depth, functional characteristics, ensembling, boosting options for in-situ optimization of performance); and library structures with robustness and adaptability characteristics embedded. Library components aren't purely architecture based (like functionality of the neural network, depth, number of neurons, or the like). Rather, the components also include the data used for training the neural network. A combination of other neural networks may be used for pre-training. The library may be a hybrid library in that it includes traditional logic and memory structures, along with learning structures.

Controller for Hierarchical Self-Construction of Neural Network

A controller macro is proposed which is responsible for the (1) construction; (2) reconfiguration towards optimization; and (3) reconfiguration/adaptation. The controller macro may hierarchically divide the functionality into smaller building blocks.

Multi-Objective, Online Genetic Algorithm for Construction

This is a custom algorithm that is built on the high-level idea of a genetic algorithm. Its customizations include (but are not limited to):

a. Balances Real-time Robustness/Efficiency/Performance;

b. Each macro/unit has multiple modes, (i) high-level specs for the genetic algorithm selection (ii) In-situ optimization mode (through Boosting/Ensembling/Architectural fine-tuning) to optimize the block performance in its selected role;

c. Randomized steps such as mutations can be customizable towards Adversarial scenarios (or Online learning, where different environmental possibilities are passed on to the system);

d. Continuous optimization beyond design time, for real-time/online learning adaptation; and e. Custom termination function based on the adversarial testing and conditions for building blocks.

Online Reconfiguration of Neural Network System

The proposed system uses the underlying construction logic to stay active to decide on the reconfiguration for real-time changes in the underlying data patterns, adversarial interaction patterns. The online configuration system may change the configuration of the blocks based on: Depth of Neural Networks, Interconnectivity, Neural Network Architecture, Functionality, Activation Functions, Edge Weights, Number of Neurons etc. Edge weight changes are the most frequent, where with increased changes more fundamental changes can be made gradually in the architecture. Similarly training and retraining the neural networks may be performed. In a software implementation (e.g., where the design is not hardware implemented) macros can also be replaced with others. The controller may continuously track the data patterns and decide on the type of reconstruction needed.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
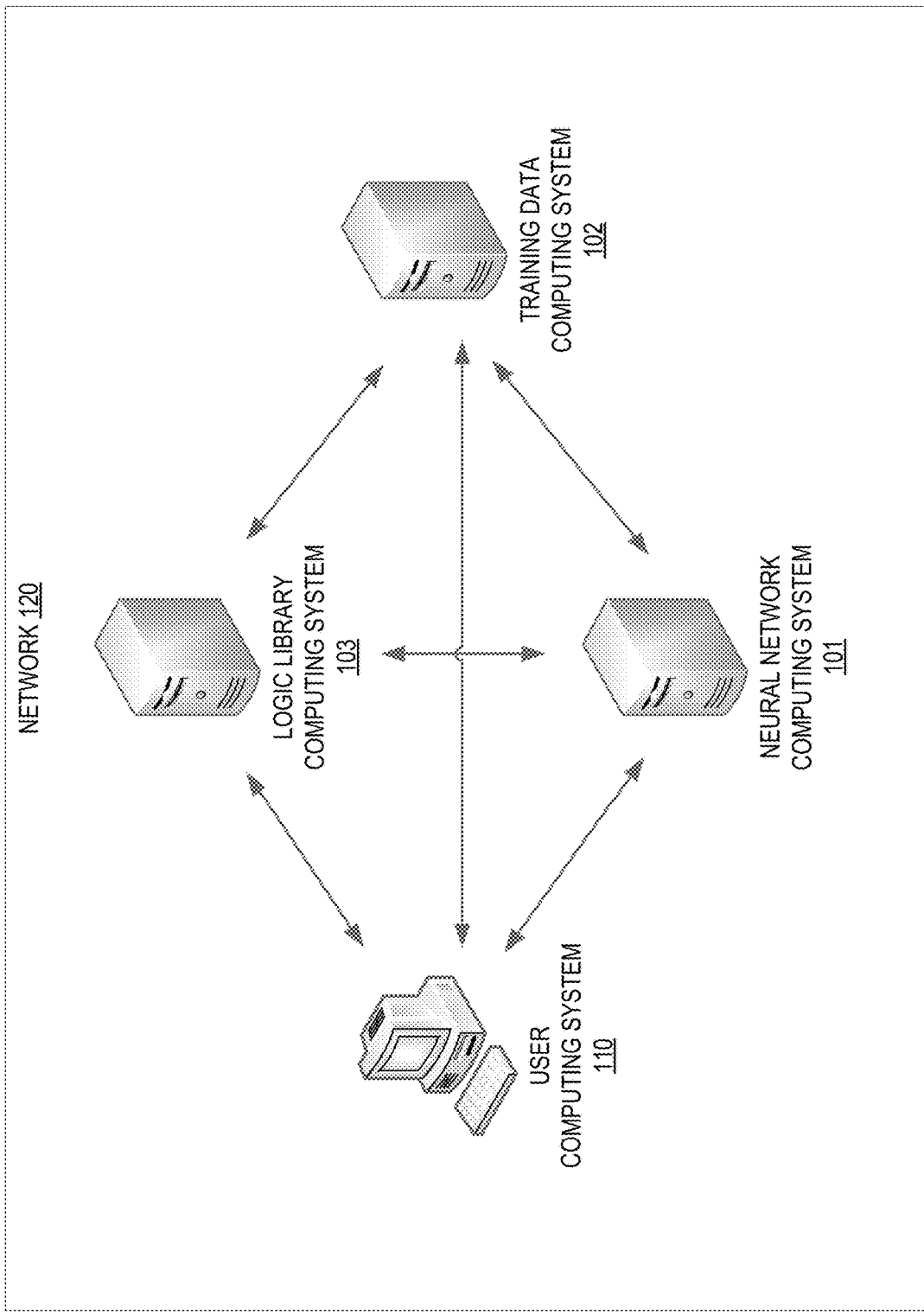
Figure 2:
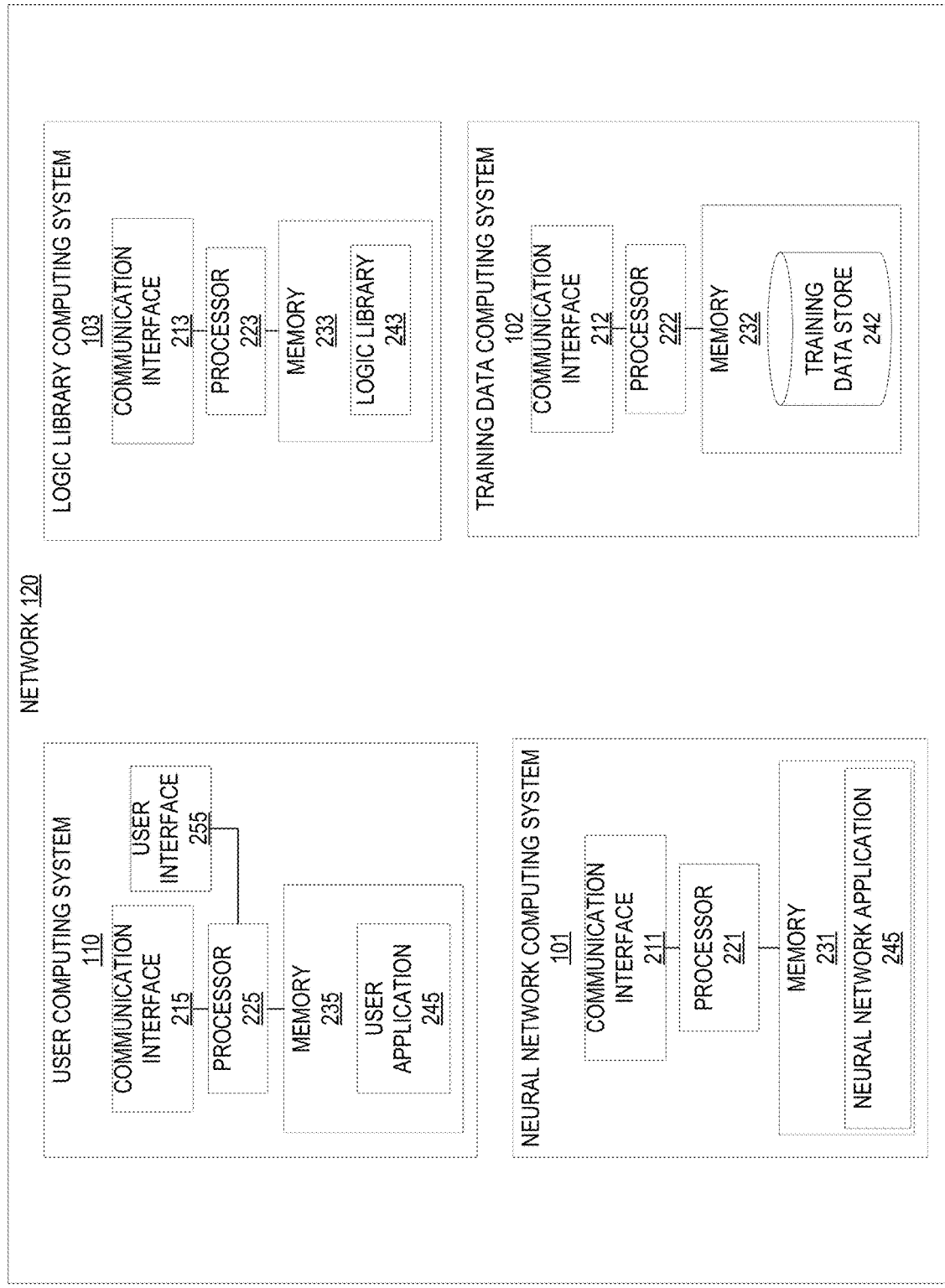
Figure 3:
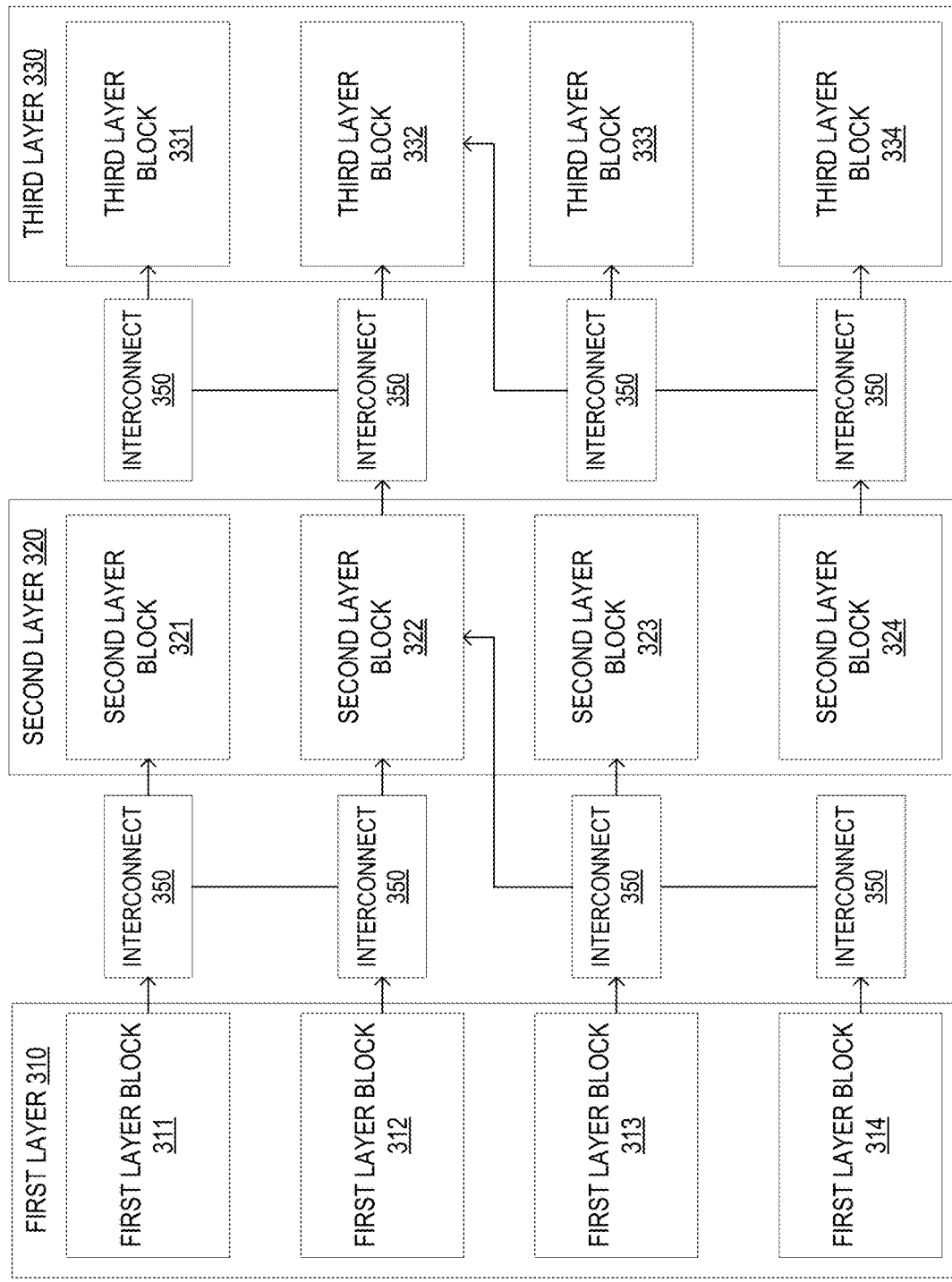
Figure 4:
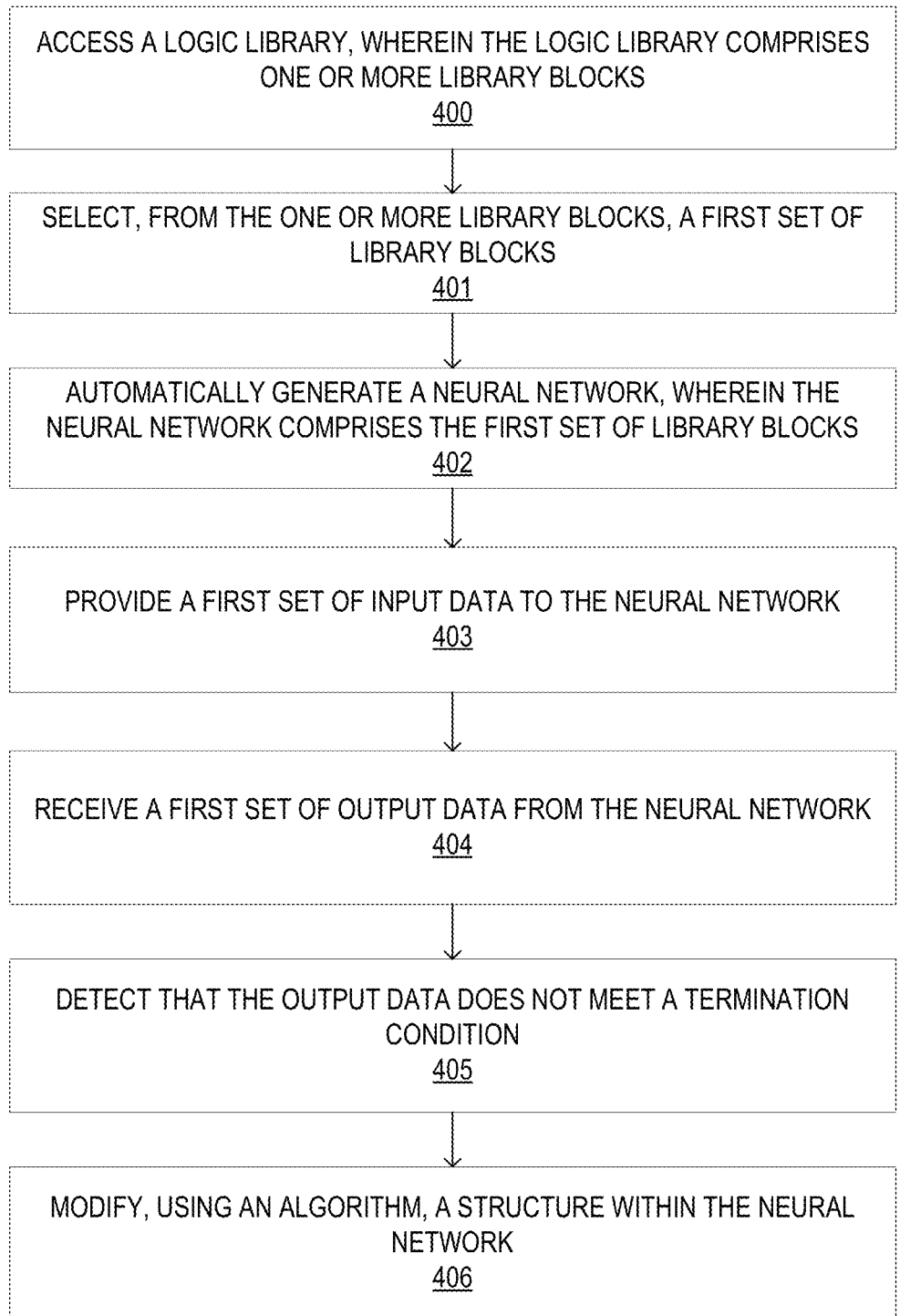

Having thus described embodiments of the disclosure in general terms, reference will now be made to the accompanying drawings, wherein:

FIG. 1 is a block diagram illustrating an operating environment for a self-constructing neural network system, in accordance with some embodiments of the present disclosure;

FIG. 2 is a block diagram illustrating the neural network computing system, the training data computing system, the logic library computing system, and the user computing system in more detail, in accordance with some embodiments of the present disclosure;

FIG. 3 is a block diagram illustrating the data structures within an exemplary neural network, in accordance with some embodiments of the present disclosure; and FIG. 4 is a process flow for the self-constructing neural network system, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the self-constructing neural network system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, and/or other resources used by the entity to construct neural networks. Accordingly, the entity system may comprise database servers, Internet-of-Things ("IoT") devices, compute nodes, networked terminals, smart devices (e.g., smart watches), and/or other types of computing systems or devices along with their associated applications.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Neural network" as referred to herein may refer to a network of computing nodes that use machine learning algorithms to accomplish certain tasks. Broadly, neural networks may be used for tasks requiring pattern recognition. For instance, a neural network may be constructed and used for the purposes of speech recognition, facial recognition, machine translation, or the like.

"Node" or "neuron" as used herein may refer to a functional unit within the neural network which may receive inputs, perform calculations based on the inputs, and produce outputs based on the calculations. In some embodiments, each node may be configured to produce an output only when the aggregated weighted inputs exceeds a certain threshold. Nodes may be structured such that some of the nodes receive inputs and/or outputs from other nodes. Based on the inputs received, the calculations performed on the inputs may change over time. For instance, a set of nodes may change the weights or biases for certain inputs based on learning algorithms (e.g., machine learning). In some embodiments, nodes may be arranged into layers, where each "layer" of nodes is configured to accomplish a specific task within the overarching objective of the neural network. Typically, the neural network comprises an input layer, and output layer, and one or more hidden layers in between the input layer and output layer, such that a neural network receives one or more signals through the input layer, at which point the signals propagates through the various layers of the neural network before reaching the output layer. Accordingly, in some embodiments, a neural network may itself be considered to be a node.

Embodiments of the present disclosure provide a system for a self-constructing neural network through adversarial learning. In particular, the system may use a logic library comprising known and custom neural network building blocks in conjunction with a custom multi-objective genetic-based algorithm to automatically construct neural networks. Through the process of self-constructing neural networks as described herein, the system is able to create neural networks with far greater depth and complexity than may be possible through conventional means.

As described above, the system may comprise one or more logic libraries for neural networks, where each logic library may be tailored to a particular objective. A logic library may comprise one or more library blocks (e.g., nodes or neural networks) which may perform various functions within the neural network. Examples of library blocks may include recurrent neural networks ("RNN"), convolutional neural networks ("CNN"), multi-layer perceptrons ("MLP"), deep stacking networks ("DSN"), long short term memory ("LSTM") units, autoencoders, Boltzmann machines, or the like. Some library blocks may have memory capabilities, and/or contain various types of information regarding the operation of the neural network, such as functional specifications, timing for data production, power dissipation, energy efficiency, area for hardware implementations, or the like. The logic library may further encompass traditional logic gates (e.g., AND, OR, NAND, NOR, XOR, or the like), configurable macros, operators, and/or interconnects which may link other types of functional blocks with one another. Based on the characteristics of the library blocks and the objectives of the neural network to be constructed, the hierarchical modularity of the library blocks may allow the system to design and tweak the configuration of the neural network dynamically.

The system may select library blocks based on various characteristics or criteria as well as the objectives of the neural network to be constructed. For instance, a block may be selected based on its functional characteristics (e.g., input and/or output characteristics, performance indicators, or the like), its architectural characteristics (e.g., connectivity of neurons, depth of the network, number of neurons, activation functions, or the like), its training characteristics (e.g., uses training data from different segments, time ranges, geographical ranges, subsets of features, or the like), hardware characteristics (e.g., use of hardware resources, area of hardware, power consumption, or the like), or the like. In some embodiments, certain library blocks may be pre-trained using one or more specific data sets depending on the context in which the neural network is to be used.

In an exemplary embodiment, an entity (e.g., a financial institution) may wish to identify cases in which an unauthorized person attempts to access a user's account with the entity (e.g., a client). From the logic library, the system may construct a neural network and train the neural network using data sets of authorized vs. unauthorized users across various segments, ranges, and/or scenarios. In other words, the system may select an arrangement of blocks based on not only their functional, architectural, or hardware characteristics, but especially the training characteristics. For instance, a neural network may be trained using training data according to transaction segments (e.g., debit card transactions, account transfers, or the like), customer segments (e.g., operational segments such as retail vs. business segments, or the like), geographic segments, time ranges (e.g., different months, years, times of day, or the like), or the like. Once the trained networks exist within the library, the system may select the trained blocks to construct a neural network that addresses the segments as selected by the entity.

The system may select not only the library blocks to be used, but also determine the optimal configuration and/or connectivity between blocks. Over time, as the performance of the resulting neural network is evaluated, the configuration of library blocks and/or interconnects may be recursively modified to find the most suitable neural network configuration for the entity's purpose. In this regard, the logic library may comprise library blocks that are classified according to hierarchy (e.g., high-level, low-level, or the like). In such embodiments, the low-level blocks, which make up the core functionality of the neural network, may be unmodified by the system, whereas the high-level blocks may be swapped and/or shifted to optimize the performance of the neural network.

In constructing the neural network, the system may use a custom multi-objective genetic algorithm to modify the structure of the neural network over a series of iterative processes. In particular, a random selection of library blocks and/or macros may be selected to be placed into the initial neural network configuration. Once the initial setup is constructed, the system may provide inputs to the initial neural network to examine the efficacy of the outputs provided therein. The system may set a termination condition for the neural network construction process, where the termination condition is checked for each "iteration" or "generation" of the process. Typically, the termination condition is selected such that the resulting neural network achieves a balance of robustness, efficiency, and/or performance (i.e., the custom algorithm has multiple objectives). If the system determines that the termination condition has not been met, the system may create one or more random changes (e.g., mutations) in the neural network structure by adding, removing, swapping, and/or changing the connectivity of one or more library blocks.

In some embodiments, adversarial testing may be conducted on the neural network in real time to further optimize the performance of the network. For instance, the system may train the neural network with data sets of authorized users (e.g., testing whether the neural network positively identifies authorized users) as well as data sets of unauthorized users (e.g., testing whether the neural network positively identifies unauthorized users). Furthermore, the system may train the neural network with various data segments (e.g., organizational status, or the like) and/or contexts (e.g., ATM transactions, online transactions, or the like). In such embodiments, the termination condition may be configured to achieve generalizable and robust performance across multiple segments and contexts under adversarial conditions (e.g., an unauthorized user actively attempts to gain access to a customer's account).

Once the termination condition has been reached, the neural network will be considered to be suitable for the purpose for which it has been constructed. From this point, the neural network may undergo further fine-tuning or optimization in real time. Through this iterative process, the system may automatically construct a generation of the neural network which is far deeper and complex than networks constructed by manual means.

The system as disclosed herein addresses a number of technology-centric challenges associated with constructing neural networks. By using the system as described herein, an entity may autonomously design, construct, and refine neural networks which have significantly greater complexity and depth compared to manually constructed neural networks. In other words, the system may allow for the construction of neural networks which are impracticable or impossible to construct using conventional means. Furthermore, the custom genetic algorithm increases the efficiency of the neural network construction process and subsequent training, which in turn prevents inefficient use of computing resources that may be expended when conducting manual, non-systematic construction of neural networks.

Turning now to the figures, FIG. 1 is a block diagram illustrating an operating environment for the self-constructing neural network system, in accordance with some embodiments of the present disclosure. In particular, the operating environment may include a neural network computing system 101, a training data computing system 102, a logic library computing system 103, and a user computing system 110 in operative communication with one another within a network 120. The network 120, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The neural network computing system 101 may be a computing system that uses a custom multi-objective algorithm to design, construct, and/or refine a neural network. Accordingly, the network computing system is typically a "headless" computing system such as a networked terminal or server, but may also be a desktop computer, laptop, smartphone or smart device, IoT device, or the like, or any combination thereof. The neural network computing system

101 may further host and/or operate the neural network which has been constructed using the process described herein.

The operating environment may further comprise training data computing system 102, which may host various types of training data to be used in training the neural network generated and/or hosted on the neural network computing system 101. In an exemplary embodiment, the neural network computing system 101 may construct a neural network for using voice recognition to detect potentially unauthorized attempts to gain unauthorized access to a user's account. In such embodiments, the training data computing system 102 may comprise training data which includes various voice samples (e.g., young, old, male, female, or accented voices, or the like). By training the neural network using the voice training data, the system may be able to enhance the neural network's ability to determine positive and negative matches.

The operating environment may further comprise a logic library computing system 103 which may host the custom logic library as described elsewhere herein. The neural network computing system 101 may access the logic library stored on the logic library computing system 103 to access the blocks (e.g., neural networks, macros, logic gates, memory structures, or the like) needed to construct a neural network.

The operating environment may further comprise a user computing system 110 which may be in operative communication with the other computing systems within the network 120. In particular, the user computing system 110 may allow a user to access, add, and/or manage the training data within the training data computing system 102. In some embodiments, the user computing system 110 may further be configured to access the logic library computing system 130 to tweak the blocks within the logic library. For instance, the user computing system 110 may train one or more neural networks within the logic library using training data within the training data computing system 102. The user computing system 110 may also access the neural network computing system 101 to define termination conditions, modify neural network architecture, set training parameters, or the like.

It should be understood by those having ordinary skill in the art that although the neural network computing system 101, the training data computing system 102, the logic library computing system 103, and/or the user computing system 110 are depicted as single units, each of the depicted components, or sub-components therein, may represent multiple units. For instance, in some embodiments, a given computing system as depicted in FIG. 1 may represent multiple systems configured to operate in a distributed fashion (e.g., the neural network computing system 101 may represent multiple computing systems which host and/or construct the neural network). In other embodiments, the functions of multiple computing systems may be accomplished by a single system. For example, the functions of the training data computing system 102 and/or the logic library computing system 103 may also be executed by the neural network computing system 101.

FIG. 2 is a block diagram illustrating the neural network computing system 101, the training data computing system 102, the logic library computing system 103, and the user computing system 110 in more detail, in accordance with some embodiments of the present disclosure. The neural network computing system 101 may comprise a processor 221 communicably coupled to such devices as a communication interface 211 and a memory 231. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The neural network computing system 101 may use the communication interface 211 to communicate with other devices over the network 120. The communication interface 211 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the neural network computing system 101 may comprise a neural network application 245. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The neural network application 245 may comprise executable code for constructing a neural network using library blocks and/or elements and training neural networks. Furthermore, the executable code may comprise the custom genetic algorithm which may be used to tweak the neural network by adding, removing, and/or swapping library components, modifying the neural network architecture (e.g., interconnects, macros, or the like), setting termination conditions, fine tuning and optimizing the neural network in situ, or the like. To this end, the neural network application 245 may cause the neural network computing system 101 to, via the communication interface 211, communicate with the user computing system 110, logic library computing system 103, and/or the training data computing system 102 to pull training data, access logic library blocks or structures, accept user inputs for modification of the neural network and/or setting of termination conditions, or the like.

The training data computing system 102 may also comprise a processor 222 communicatively coupled with such devices as a communication interface 212 and a memory 232. The memory 232 of the training data computing system 102 may comprise a training data store 242, which may comprise various types of data used to train neural networks. In this regard, the training data may be accessed by the neural network computing system 101, the logic library computing system 103, and/or the user computing system 110 to train the neural networks stored thereon. In an exemplary embodiment, the training data may comprise data related to detection of the identify of authorized users and/or unauthorized users, such as voice samples, facial image samples, account activity data, user behavior data, or the like. The training data may further comprise user data across multiple different segments. For instance, the training data may be segmented according to transaction context (e.g., ATM transactions, online transactions, mobile transactions, or the like) and/or by customer segments (e.g., geography, retail or business sectors, VIP segments, or the like). In addition, the training data may comprise adversarial training data which may be used to train neural networks in adversarial conditions. For instance, the neural network may be presented with user behavior data which contains suspicious or potentially unauthorized activity. Using such training data, the neural network may be refined and/or optimized to successfully recognize the suspicious user behavior.

The logic library computing system 103 may also comprise a processor 223 operatively coupled to a communication interface 213 and a memory 233, wherein the memory 233 has a logic library 243 stored thereon. As described elsewhere herein, the logic library 243 may contain the blocks or structures to be used in constructing and/or modifying neural networks. For instance, the logic library 243 may contain neural networks, macros, interconnects, memory structures, logic gates, or the like. In this regard, the blocks within the logic library 243 may be accessed by the neural network computing system 101 and/or the user computing system 110 to create or modify neural networks stored thereon.

The user computing system 110 may also comprise a processor 225 in operative communication with a communication interface 215 and a memory 235. The user computing system 110 may further comprise a user interface 255, which may comprise the hardware and software implements to accept input from and provide output to the user. The user interface 255 may comprise hardware such as a display, audio output devices, projectors, and the like, or input devices such as keyboards, mice, sensors, cameras, microphones, biometric input devices (e.g., fingerprint readers), and the like. The user interface 255 may further comprise software such as a graphical or command-line interface through which the user may provide inputs and/or receive outputs from the user computing system 110. It should be understood that the display on which the user interface 255 is presented may include an integrated display (e.g. a tablet or smartphone screen) within the user computing system 110, or an external display device (e.g. a computer monitor or television).

The memory 232 of the user computing system 110 may comprise a user application 245 stored thereon. The user application 245 may allow a user to access the neural network computing system 101 to manually tweak the neural network stored therein. For instance, in typical embodiments, the system automatically sets termination conditions based on various factors (e.g., generalizability, efficiency, accuracy, or the like). That said, in some embodiments, the user may manually set termination conditions or establish objectives to be accomplished in the optimization process.

The user application 245 may further allow the user to access the logic library computing system 103 to access the library blocks therein. In particular, the user may be authorized to modify the blocks (e.g., neural networks, macros, or the like) within the logic library. For instance, in some embodiments, if the logic library contains a neural network, the user may manage or control further training of the neural network.

FIG. 3 is a block diagram illustrating the data structures within an exemplary neural network, in accordance with some embodiments. In particular, FIG. 3 depicts a plurality of first layer blocks 311, 312, 313, 314 within a first lawyer 310 of the neural network. Each first layer block 311, 312, 313, 314, along with other blocks as described herein, may represent one of various library blocks from a logic library. Such examples of library blocks may include neural networks such as Boltzmann machines, multiplayer perceptrons, autoencoders, memory structures, or the like. In some embodiments, the first layer 310 may be an input layer which represents the starting point of the decision-making process of the neural network. The first layer blocks 311, 312, 313, 314 may receive initial input data (e.g., training data, real-world application data, or the like) from a user, other neural networks, or the like. In some embodiments, the first layer blocks 311, 312, 313, 314 may accept assign weights to the various inputs received, which may in turn affect the outputs of the first layer blocks 311, 312, 313, 314 to other blocks within the neural network.

The first layer blocks 311, 312, 313, 314 may be communicatively coupled with a plurality of second layer blocks 321, 322, 323, 324 within a second layer 320 via a series of interconnects 350. In some embodiments, the second layer 320 maybe referred to as the "hidden layer." The interconnects 350 may be logic gates, macros, or other types of logic structures which may serve as the intermediaries between different layers. In particular, the interconnects 350 may receive inputs from blocks in one layer (e.g., the first layer blocks 311, 312, 313, 314) and transmit outputs to one or more blocks in another layer (e.g., the second layer blocks 321, 322, 323, 324). An interconnect 350 may receive inputs from one or multiple blocks within the first layer 310 and transmit outputs to one or multiple blocks within the second layer 320. For example, FIG. 3 shows an interconnect 350 receiving an input from a first layer block 313 and providing outputs to two second layer blocks 322, 323.

The second layer blocks 321, 322, 323, 324 within the second layer 320 may receive input data from the first layer blocks 311, 312, 313, 314 through the numerous interconnects 350, as described above. In some embodiments, said input data may be weighted inputs (e.g., each second layer block 321, 322, 323, 324 may assign different weights to the various inputs). For example, the second layer block 322 may receive two sets of input data (e.g., from the first layer block 312 and the first layer block 313). In the initial phase (e.g., before training or implementation has commenced), the second layer block 322 may give each input equal weight. As the neural network is trained with successive iterations over a period of time, the weights of both inputs may be adjusted to increase the effectiveness and/or accuracy of the final outputs of the neural network.

The second layer blocks 321, 322, 323, 324, after processing the inputs received from the blocks in the first layer 310, may transmit outputs to one or more third layer blocks 331, 332, 333, 334 within the third layer 330. In some embodiments, the third layer 330 may be referred to as the "output layer." Similar to the blocks in the second layer 320, the third layer blocks 331, 332, 333, 334 may receive weighted input values from the second layer blocks 321, 322, 323, 324, after which the third layer blocks 331, 332, 333, 334 may process the input data to produce the final output values. In scenarios in which the neural network is being trained, once the final output values have been produced, the final output value may be compared to an expected value. Based on the comparison, further input (e.g., positive or negative reinforcement) may be provided to the input layer of the neural network, creating another iteration of the decision making process. In scenarios in which the neural network has been implemented into the entity's production environment, the final output values produced by the neural network may subsequently be used to execute one or more workflows relevant to the entity's objectives.

Periodically, the system may check to see if a particular iteration of the neural network has satisfied one or more termination conditions. A termination condition may be a parameter set to balance various performance metrics for the neural network. For instance, an example of a termination could be a requirement that false positives in identification of a user falls below a certain threshold (e.g., 5%). If the termination condition is not met in a particular iteration, the system may use a custom, multi-objective genetic algorithm to introduce a random "mutation" in the composition and/or structure of the neural network. In some embodiments, the mutation may involve the addition, removal, and/or substitution of one or more library blocks within the neural network. For instance, the first layer block 311 may be changed from a Boltzmann machine to a multilayer perceptron, while an additional blocks may be introduced into the second layer 320 to provide further processing of input data. In other embodiments, the mutation may involve the creation or removal of connections between or among multiple blocks. For instance, the interconnect 350 providing output data to the second layer block 322 and the second layer block 323 may be further configured to provide output data to the second layer block 324.

After making the structural change in the neural network via the custom algorithm, the neural network may undergo further testing and/or training to evaluate the effects of the structural change. The neural network may be provided with further inputs to create another iteration, wherein the termination conditions are reassessed at the end of the iteration. If the system determines that the termination conditions have been met, the system may preserve the basic elements of the neural network structure while performing fine-tuning of the configuration in situ. Over time, as the system performs real time fine-tuning, the neural network may become increasingly optimized for accomplishing the objectives for which the neural network has been implemented.

In this regard, the system may be perform online reconfiguration of the neural network system in real time. In other words, the fine tuning of the configuration of the neural network will continuously occur while the neural network has been implemented into the production environment and is in operation. The controller may continuously monitor the data patterns and outputs of the neural network over time. Based on the monitoring performed by the controller, the system may, using construction logic, actively decide which elements in the neural network should be modified based on underlying data patterns and/or adversarial interaction patterns.

The system may tweak the configuration of the neural network without disrupting the core functionality of the online neural network. For instance, the system may modify the depth, interconnectivity, architecture, functionality, activation functions, edge weights, and/or number of neurons of the neural network. Typically, the system modifies the edge weights (e.g., the weight of the inputs into one or more blocks in the neural network). In embodiments in which the neural network is a software implementation, certain macros within the neural network may be swapped with other macros.

FIG. 4 is a process flow for the self-constructing neural network system, in accordance with some embodiments. The process begins at block 400, where the system access a logic library, wherein the logic library comprises one or more library blocks. As described above, the logic library may comprise the building blocks needed to construct the neural network. The library blocks may include other neural networks, logic structures, macros, memory structures, learning structures, and the like. The logic library, in some embodiments, may further comprise training data to be used to train and/or pre-train neural networks.

In some embodiments, the library blocks may include "parent" structures which comprise various functional characteristics, ensembling, and/or boosting options for performing in situ (i.e., in real time) optimization of a neural network's performance. The parent structures may be flexible and adaptable "fuzzy" structures which may be configured depending on the use case and/or neural network in which they are implemented. The library blocks may further include more rigid "child" structures which may have more clearly defined functions or roles. The library blocks may further comprise library structures with robustness and/or adaptability characteristics embedded such that the neural network may be equipped to handle a broad range of environments and implementations.

In an exemplary embodiment, an entity may use the system to construct a neural network for detecting unauthorized user activity. For instance, a user may attempt to provide illegitimately obtained authentication credentials to gain unauthorized access to another user's account and/or resources. In such embodiments, the logic library may be a library containing various library blocks to be used in detecting unauthorized activity. For instance, the library blocks may include neural networks for voice recognition, facial image recognition, user behavior detection and analysis, or the like. By combining the various related library blocks, the system may be able to create a deep and complex neural network for detecting and preventing unauthorized users from gaining access to the system.

The process continues to block 401, where the system selects, from the one or more library blocks, a first set of library blocks. The system may make the initial selection of library elements based on the objective to be accomplished and various characteristics of the library blocks in the selection group. For example, the system may take into account a block's functional characteristics (e.g., input and/or output characteristics, performance indicators, or the like), its architectural characteristics (e.g., connectivity of neurons, depth of the network, number of neurons, activation functions, or the like), its physical and/or performance related characteristics (e.g., energy efficiency, heat dissipation, area, or the like), and other characteristics.

The system may further take into account various training characteristics or contexts, such as training a neural network using training data from certain segments or subsegments, or with a subset of features, time ranges, geographical ranges, transactional contexts, or the like. In embodiments in which some of the library blocks are neural network, said neural networks may be pre-trained with training data to achieve an expected level of performance across several parameters (e.g., configurability, generalizability, efficiency, effectiveness, or the like).

Continuing the exemplary embodiment as described above, the system may select one or more blocks based on the capabilities of the blocks to aid in detection of unauthorized activity. In some embodiments, the system may select blocks based on detecting unauthorized activity in certain segments or transactional contexts. For example, when attempting to construct a neural network for detecting suspicious online activity, the system may preferentially select library blocks which have the capability to detect unusual user behavior. On the other hand, if the system is constructing a neural network for detecting unauthorized activity over the phone or online teleconference or videoconference, the system may select library blocks which provide voice recognition and/or facial recognition capabilities.

The process continues to block 402, where the system automatically generates a neural network, wherein the neural network comprises the first set of library blocks. In some embodiments, the system may arrange the library blocks into one or more layers. In an exemplary embodiment, the system may arrange a first set of library blocks into a first layer (e.g., an input layer), a second set of library blocks into a second layer (e.g., a hidden layer), and a third set of library blocks into a third layer (e.g., an output layer). The blocks in the first layer may receive input data (e.g., training data, workflow data, or the like) from outside of the neural network, perform calculations and/or transformations of the data, and subsequently transmit output data to the blocks in the second layer through one or more interconnects. The second blocks may receive the outputs of the first blocks as input data, then subsequently transmit output data to the blocks in the third layer through another series of interconnects. In this manner, the input data as received by the first layer may be transformed and propagated through the various layers within the neural network.

The each interconnect within the neural network may be a macro, logic gate, or other type of logical structure which may receive inputs, perform operations, and/or produce outputs. In this regard, each interconnect may be configured to receive an input from a block in one layer and transmit outputs to one or more blocks within another layer. As described elsewhere, the output data transmitted by a block in one layer may be received as a weighted input by a block in another layer. In other words, certain input data may have a greater effect on the decision making process of a block as well as the block's subsequent output based on the one or more sets of input data.

The process continues to block 403, where the system provides a first set of input data to the neural network. In some embodiments, the input data may be training data which may be used to evaluate the performance of the neural network for a particular intended function. In other embodiments, the input data may be part of a workflow for a neural network which has been implemented into the production environment for its intended purpose. For example, in the training context, the input data may comprise adversarial training data which may simulate a scenario in which a user has attempted to gain unauthorized access to the system. The adversarial training data may comprise the voice data samples, facial image data samples, user behavior, or other types of user-related data. By providing adversarial training data as input data, the system may progressively tweak and optimize the neural network's ability to positively detect unauthorized user activity by employing machine learning methods.

The process continues to block 404, where the system receives a first set of output data from the neural network. In some embodiments, the output data may be a binary value (e.g., 0 or 1) which represents a decision reached by the neural network based on the initial input data. For instance, the neural network may determine whether or not a user's voice data sample (e.g., the initial input data) matches a voice data sample associated with the account which the user is attempting to access, and therefore determines that the user is either an authorized party or unauthorized party. In other embodiments, the output data may be a confidence value (e.g., a value between 0-100) which reflects the degree of certainty to which the neural network has been able to positively identify a user.

The output data produced by the neural network may be compared to excepted output values, which may be context-dependent. For example, in the training context, the output data produced by the neural network may be compared to an expected output based on the training data input (e.g., when a voice data sample from a known unauthorized user is provided to the neural network, the system may expect a positive identification of the unauthorized user). In embodiments in which the neural network has been implemented into the production environment, the output data may be used to assess the real-world performance of the neural network over a period of time (e.g., historical real-world performance). Based on the output data, the system may make one or more modifications to the neural network to increase the performance of the neural network along various metrics, as have been described elsewhere herein.

The process continues to block 405, where the system detects that the output data does not meet a termination condition. The termination condition may be set based on the expected level of performance of the neural network. For instance, one termination condition may require that the neural network is able to identify unauthorized users at a particular success rate (e.g., 75%). Another termination condition may be the ability of the neural network to detect unauthorized activity across multiple environments and/or segments (e.g., different types of transactions, different customer segments, geographical areas, or the like). Typically, the system may set one or more termination conditions to achieve a balance of effectiveness, efficiency, configurability, and generalizability.

If the output data does not meet the termination condition(s), then the process continues to block 406, where the system modifies, using a custom algorithm, a structure within the neural network. The custom algorithm may make random modifications (e.g., a "mutation") in the configuration, structure, and/or composition of the neural network to create a new "generation" of the neural network. For instance, the custom algorithm may swap certain library blocks or elements for other library blocks or elements, change the connectedness of library blocks by modifying interconnects, macros, and/or workflows, or the like. In some embodiments, the "randomizations" may be tailored to certain objectives and/or environments (e.g., an adversarial scenario). Once the structure of the neural network has been changed, the process may loop back to block 403, where the system provides an additional set of input data to the neural network. Because the structure of the neural network has changed, the output of the neural network may also change. After the neural network again produces output data, the output data may be assessed against the one or more termination conditions. This iterative process may continue until the output of the neural network has satisfied the termination conditions as set by the system.

On the other hand, if the system determines that the termination condition has been met by the output of the neural network, the system may consider the neural network ready for implementation into the system. For instance, if the objective of the neural network is detection of unauthorized activity in ATM transactions, a neural network which has satisfied the termination conditions may subsequently be implemented into the production environment to monitor ATM transactions for potentially unauthorized users. Once the neural network has been implemented, the system may continually optimize the neural network by online learning in situ as time progresses. In other words, rather than creating high-level, fundamental structural changes in the neural network, the system may fine tune the performance of the neural network in real-time across various performance parameters, such as energy efficiency, heat generation, processing speed, accuracy of decision making, or the like. In this way, the system provides not only a way to generate neural networks which are deeper and more complex than networks produced by conventional means, but the system also provides a way to make in situ adjustments to the neural networks to optimize the performance of the neural network over time.

In this regard, the system may use construction logic to perform online reconfiguration of the neural network. The system may continuously monitor the neural network for real-time changes in the data patterns and/or adversarial interaction patterns. For instance, the system may continuously assess the rate of successful detection of unauthorized users, the rate of false positives, decision-making speed, breadth of compatibility with different channels, and the like. The system may then determine that an improvement in one or more of these above dimensions could be made by modifying the structure of the neural network.

Subsequently, the system may change the configuration of one or more blocks within the neural network. For example, the system may change the depth of the neural network by creating additional layers, change the interconnectivity between blocks, alter activation functions and/or thresholds, change input weights for one or more blocks, alter the number of neurons (e.g., blocks), or the like. In other embodiments, the system may perform training and/or retraining of one or more blocks in situ over time. In such embodiments, performance increases may be realized by the system even if no other architectural changes are made to the neural network.

After changing the configuration of the neural network, the system (e.g., via a controller) may continue to monitor the changes in data patterns within the neural network. Based on continuing to monitor the changes, the system may make additional changes as needed to further increase the performance of the system. In an exemplary embodiment, the system may increase or decrease the weights of one or more inputs for a block in the neural network, where the block is another neural network. After making said change, the system may continuously monitor the effect of the change on the data patterns of the neural network. For instance, the system may detect that increasing an input weight for a particular block has improved the detection rate of unauthorized users. Based on detecting said improvement, the system may incrementally increase the input weight for the particular block and continue to detect the data patterns. On the other hand, if the system detects that increasing the input weight for the block has degraded performance of the neural network, the system may decrease the input weight. In this manner, the system may continue to tweak performance as time progresses. Over time, the neural network will continuously gain improvements in performance according to the entity's needs.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

What is claimed is:

1. A system for online reconfiguration of a neural network, comprising:
    a processor;
    a communication interface; and
    a memory having executable code stored thereon, wherein the executable code, when executed by the processor, causes the processor to:
        access a building block library, wherein the building block library is a hybrid hierarchical library comprising one or more library blocks having adaptability characteristics embedded, the one or more library blocks comprising flexible parent structures with configurable characteristics;
        select, from the one or more library blocks, a set of library blocks, wherein selecting the set of library blocks is based at least partially on performance characteristics, the performance characteristics comprising at least one of energy efficiency, heat generation, or processing speed;
        automatically generate a neural network using a self-constructing neural network architecture, wherein the neural network comprises the set of library blocks, wherein the set of library blocks comprises one or more low-level blocks associated with a core functionality of the neural network and one or more high-level blocks associated with performance optimization of the neural network; and
        perform, via a controller, online reconfiguration of the neural network, wherein the controller makes decisions on the reconfiguration of the neural network and levels of reconfiguration needed, wherein the online reconfiguration of the neural network comprises:
            setting a termination condition associated with the online reconfiguration of the neural network;
            providing inputs to the neural network;
            determining, based on outputs provided by the neural network, that the termination condition has been met; and
            performing fine-tuning of the neural network by creating one or more random changes in a configuration of the high-level blocks within the neural network, wherein the one or more random changes comprises at least one of adding, removing, or swapping a connectivity of one or more library blocks within the high-level blocks.

2. The system of claim 1, wherein performing online reconfiguration of the neural network comprises:
    continuously monitoring, in real time, a data pattern of the neural network;
    based on continuously monitoring the data pattern, using construction logic of an algorithm to decide on a reconfiguration of the neural network;

| Docket Number | U.S. Patent Application Ser. No. | Title | Filed On |
|---|---|---|---|
| 8629US1.014033.3297 | To Be Assigned | SYSTEM AND METHOD FOR SELF CONSTRUCTING DEEP NEURAL NETWORK DESIGN THROUGH ADVERSARIAL LEARNING | Concurrently Herewith | implementing the reconfiguration of the neural network; and assessing an effect of the reconfiguration of the neural network on a first performance metric.

3. The system of claim 2, wherein the executable code further causes the processor to:
based on continuously monitoring the data pattern, use construction logic to decide on a second reconfiguration of the neural network;
implement the second reconfiguration of the neural network; and
assess an effect of the second reconfiguration of the neural network on the first performance metric.

4. The system of claim 2, wherein the construction logic is further used to decide on the reconfiguration of the neural network based on adversarial interaction patterns.

5. The system of claim 2, wherein the algorithm is a custom, multi-objective genetic-based algorithm, wherein the algorithm comprises, for each library block, i) a high-level spec mode; and ii) an in-situ optimization mode to optimize block performance.

6. The system of claim 5, wherein the algorithm is used to perform training and retraining of the neural network.

7. The system of claim 2, wherein the reconfiguration of the neural network comprises an online change in a depth of the neural network, an interconnectivity of the neural network, the neural network architecture, functionality of the neural network, activation functions, edge weights, or number of neurons.

8. The system of claim 2, wherein the reconfiguration of the neural network comprises replacing a macro within the neural network with another macro.

9. A controller for online reconfiguration of a neural network, wherein the controller performs construction, reconfiguration toward optimization, and adaptation of the neural network, the controller comprising a processor communicatively coupled to a communication interface and a memory having executable stored thereon, wherein the executable code comprises a macro for hierarchically dividing neural network functionality into smaller building blocks, wherein the executable code, when executed by the processor, causes the processor to:
access a building block library, wherein the building block library is a hybrid hierarchical library comprising one or more library blocks having adaptability characteristics embedded, the one or more library blocks comprising flexible parent structures with configurable characteristics;
select, from the one or more library blocks, a set of library blocks, wherein selecting the set of library blocks is based at least partially on performance characteristics, the performance characteristics comprising at least one of energy efficiency, heat generation, or processing speed;
automatically generate a neural network using a self-constructing neural network architecture, wherein the neural network comprises the set of library blocks, wherein the set of library blocks comprises one or more low-level blocks associated with a core functionality of the neural network and one or more high-level blocks associated with performance optimization of the neural network; and
perform online reconfiguration of the neural network, wherein the controller makes decisions on the reconfiguration of the neural network and levels of reconfiguration needed, wherein the online reconfiguration of the neural network comprises:

setting a termination condition associated with the online reconfiguration of the neural network;
providing inputs to the neural network;
determining, based on outputs provided by the neural network, that the termination condition has been met; and
performing fine-tuning of the neural network by creating one or more random changes in a configuration of the high-level blocks within the neural network, wherein the one or more random changes comprises at least one of adding, removing, or swapping a connectivity of one or more library blocks within the high-level blocks.

10. The controller of claim 9, wherein performing online reconfiguration of the neural network comprises:
continuously monitoring, in real time, a data pattern of the neural network;
based on continuously monitoring the data pattern, using construction logic of an algorithm to decide on a reconfiguration of the neural network;
implementing the reconfiguration of the neural network; and
assessing an effect of the reconfiguration of the neural network on a first performance metric.

11. The controller of claim 10, wherein the executable code further causes the processor to:
based on continuously monitoring the data pattern, use construction logic to decide on a second reconfiguration of the neural network;
implement the second reconfiguration of the neural network; and
assess an effect of the second reconfiguration of the neural network on the first performance metric.

12. The controller of claim 10, wherein the construction logic is further used to decide on the reconfiguration of the neural network based on adversarial interaction patterns.

13. The controller of claim 10, wherein the algorithm is a custom, multi-objective genetic-based algorithm, wherein the algorithm comprises, for each library block, i) a high-level spec mode; and ii) an in-situ optimization mode to optimize block performance.

14. The controller of claim 13, wherein the algorithm is used to perform training and retraining of the neural network.

15. A computer-implemented method for online reconfiguration of a neural network, the method comprising:
accessing a building block library, wherein the building block library is a hybrid hierarchical library comprising one or more library blocks having adaptability characteristics embedded, the one or more library blocks comprising flexible parent structures with configurable characteristics;
selecting, from the one or more library blocks, a set of library blocks, wherein selecting the set of library blocks is based at least partially on performance characteristics, the performance characteristics comprising at least one of energy efficiency, heat generation, or processing speed;
automatically generating a neural network using a self-constructing neural network architecture, wherein the neural network comprises the set of library blocks, wherein the set of library blocks comprises one or more low-level blocks associated with a core functionality of the neural network and one or more high-level blocks associated with performance optimization of the neural network; and performing, via a controller, online reconfiguration of the neural network, wherein the controller makes decisions on the reconfiguration of the neural network and levels of reconfiguration needed, wherein the online reconfiguration of the neural network comprises:
  setting a termination condition associated with the online reconfiguration of the neural network;
  providing inputs to the neural network;
  determining, based on outputs provided by the neural network, that the termination condition has been met; and
  performing fine-tuning of the neural network by creating one or more random changes in a configuration of the high-level blocks within the neural network, wherein the one or more random changes comprises at least one of adding, removing, or swapping a connectivity of one or more library blocks within the high-level blocks.

16. The computer-implemented method of claim 15, wherein performing online reconfiguration of the neural network comprises:
  continuously monitoring, in real time, a data pattern of the neural network;
  based on continuously monitoring the data pattern, using construction logic of an algorithm to decide on a reconfiguration of the neural network;
  implementing the reconfiguration of the neural network; and
  assessing an effect of the reconfiguration of the neural network on a first performance metric.

17. The computer-implemented method of claim 16, the method further comprising:
  based on continuously monitoring the data pattern, using construction logic to decide on a second reconfiguration of the neural network;
  implementing the second reconfiguration of the neural network; and
  assessing an effect of the second reconfiguration of the neural network on the first performance metric.

18. The computer-implemented method of claim 16, wherein the construction logic is further used to decide on the reconfiguration of the neural network based on adversarial interaction patterns.

19. The computer-implemented method of claim 16, wherein the algorithm is a custom, multi-objective genetic-based algorithm, wherein the algorithm comprises, for each library block, i) a high-level spec mode; and ii) an in-situ optimization mode to optimize block performance.

20. The computer-implemented method of claim 19, wherein the algorithm is used to perform training and retraining of the neural network.

* * * * *